June 9, 1964      G. H. DOWTY      3,136,506

AIRCRAFT LANDING GEAR

Filed Aug. 29, 1961

INVENTOR
Sir George Herbert Dowty
By Reynolds + Christensen
attys.

United States Patent Office 3,136,506
Patented June 9, 1964

3,136,506
AIRCRAFT LANDING GEAR
George H. Dowty, Cheltenham, England, assignor to Dowty Rotol Limited, Cheltenham, England
Filed Aug. 29, 1961, Ser. No. 134,742
5 Claims. (Cl. 244—102)

This invention is concerned with the landing gear and/or other supporting structure of an aircraft, particularly a VTOL aircraft, that is to say an aircraft designed so as to be capable of vertical take-off or landing.

In a VTOL aircraft, the landing gear and/or other supporting structure takes the aircraft load during its contact with the ground and little load is taken by the wings at that time or during vertical take-off.

When the aircraft moves in a substantially horizontal direction at a speed sufficient to cause the wings to provide lift, the wings take the load and the landing gear and/or other supporting structure is wholly in a retracted position.

According to this invention, there is provided a landing gear and/or other supporting structure suitable for a VTOL aircraft, which gear or structure is so shaped and arranged that when in its retracted position, it forms a load-carrying member or part of a load-carrying member during substantially horizontal flight.

Also according to this invention a VTOL aircraft includes a landing gear and/or other supporting structure, which is so shaped and arranged that when in its retracted position, it forms a load-carrying member or part of a load-carrying member during substantially horizontal flight.

By "substantially horizontal flight" is means flight during which the aircraft may be at constant altitude or may be climbing or may be descending.

The landing gear and/or other supporting structure, when in its retracted position, may be housed within the aircraft.

Figure 1:
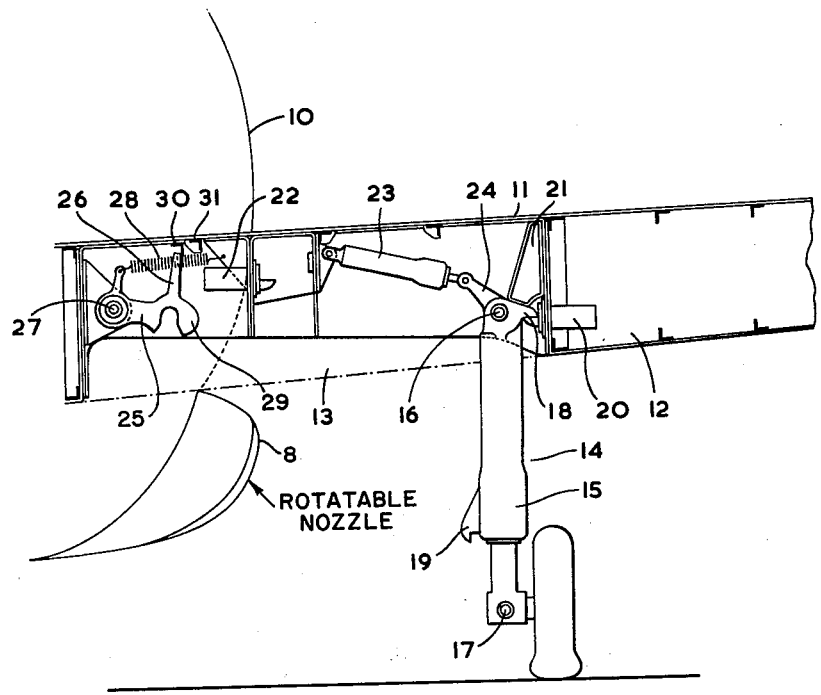
Figure 2:
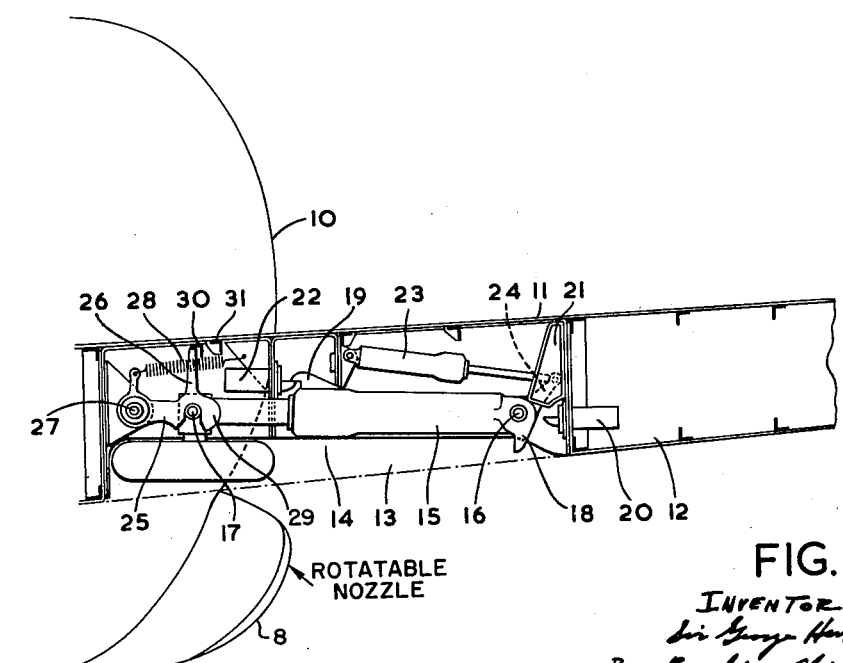

One embodiment of the invention will now be particularly described with reference to the accompanying diagrammatic drawings, of which, FIGURE 1 shows part of an aircraft with a landing gear in the extended, or "down," position, and FIGURE 2 shows the part of the aircraft of FIGURE 1 with the landing gear in its retracted, or "up," position.

Referring to the drawings, part of the fuselage of a VTOL aircraft is shown at 10 and part of the wing of the aircraft is shown at 11, there being rotatable nozzles 8 on the fuselage below the wing. A main spar 12 of the wing is cut-away at 13 to provide a stowage bay for a retractable landing gear 14, which when retracted, completes the main spar 12.

The leg 15 of the landing gear is pivotally mounted at 16 upon the wing 11 and is provided with projections 17, one of which faces forward and the other aft. The leg 15 is also provided with latching lugs, one lug 18 being provided at the top of the leg and the other lug 19 being provided at a point intermediate of the leg. In the extended position, the landing gear leg 15 is retained in that position by engagement of its latching lug 18 with a spring-loaded and hydraulically-operated downlock catch 20 and by an abutment 21 forming a part of the wing 11.

In the retracted position, the landing gear leg 15 is retained by a spring-loaded and hydraulically-operated uplock catch 22.

To effect retraction or extension of the landing gear 14, hydraulic pressure is applied both to the catches 20 and 22 and to an hydraulic jack 23 connected between a crank 24 on the leg 15 and the wing structure. It is arranged that the catches are released before the jack operates.

A pair of hooked levers 25 joined by a stirrup 26, is pivotally-mounted at 27 to a part of the wing structure remote from the pivotal connection 16 of the leg to the wing. These levers 25 are deflected downwards by means of a spring 28, such that when the landing gear is extended the hooked ends 29 of the levers 25 may be caused to lie a little below the plane containing the pivots 16 and 27. To limit the movement of the levers 25, a suitable stop 30 is provided, this depending from the skin structure 31 of the wing, against which stop the stirrup 26 can come to rest.

On retracting the landing gear, the projections 17 first make contact with the hooked ends 29 of the levers 25, lifting them until the projections enter the jaws of the hooked ends. The movement continues until the latching lug 19 engages with the spring-loaded and hydraulically-operated uplock catch 22. By this time the projections 17 have fully entered into the jaws of the hooked ends 29 of the levers 25, and the centres of the pivotal points 16 and 27, and of the projections 17 are all in the same plane. Thus, the landing gear leg 15, when in its retracted position, forms a part of the main spar 12 of the wing which spar is a load-carrying member.

In substantially horizontal flight, air loading on the wing 11 tends to bend it upwards and to increase the distance between the pivotal points 16 and 27. Such deformation of the wing is resisted by the continuous tension member formed, when the landing gear is retracted, by the coupling at the projections 17 of the levers 25 with the landing gear leg 15.

To ensure correct engagement of the projections 17 with the jaws of the hooked ends 29, and to prevent any vibration or vertical acceleration during flight from disturbing the alignment of the three points 16, 17 and 27, the stirrup 26 is extended sufficiently to reach an abutment in order that the levers 25 may not rise above the level of the plane referred to as containing points 16, 17 and 27.

In the drawings, the required restraint is effected by the upper portion of the stirrup 26 coming into contact with the skin structure 31 of the wing.

Although the embodiment has been described as applicable to the wing of an aircraft, equally well within the scope of the invention is the retraction of the landing gear into a position in which it forms a part of the fuselage structure of the aircraft. In such an arrangement the aircraft may be provided with outrigger landing gears on the wings, and these landing gears may become part of the load-carrying structure of the wings when retracted.

Again, in the case or a tricycle-type landing gear with main wheels retractable into the wings and with the nose wheel retractable into the nose of the aircraft, the main wheels may in their retracted positions form part of the load-carrying structure of the wings of the aircraft, while the nose wheel when in its retracted position may form part of the load-carrying structure of the fuselage of the aircraft.

In any embodiment of the invention, the landing gear and/or other supporting structure should be retracted either before the aircraft changes from a vertical take-off flight condition to a substantially horizontal flight condition, or, alternatively, before the aircraft attains a predetermined forward speed. It is thus desirable that suitable interconnecting means be provided to ensure that the landing gear is in its retracted and locked position before changeover to a substantially horizontal flight condition is effectetd. Also it is desirable to ensure that the landing gear may not be unlocked and moved to its extended or "down" position until the aircraft is in a vertical landing flight condition, or has reduced speed below the said predetermined speed.

The inter-connecting means may comprise electrical or mechanical means.

For instance, where the VTOL aircraft has jet engines fixed in relation to the aircraft for producing a vertical thrust and has other jet engines fixed in relation to the aircraft for producing a usually substantially horizontal thrust, the interconnecting means can comprise a mechanical linkage between the landing gear uplock catch and the throttle control of the jet engines for producing the substantially horizontal thrust. This linkage is such that the throttle control cannot be moved, or cannot be moved beyond a position corresponding to a certain forward air speed (this being, say, the air speed which is just sufficient to cause the aircraft wing to provide lift), until the landing gear is locked in its retracted position and forms part of the load-carrying structure of the aircraft. When the aircraft is coming into land the, or other, mechanical linkage will ensure that the throttle control must be moved to a position below that corresponding to a certain forward air speed before the landing gear is unlocked and moved to its "down" position.

Alternatively, the inter-connecting means described in the immediately preceding paragraph can be replaced by an electrical means which controls a switch or switches which release a lock or locks to allow throttle movement according to the position of the landing gear with respect to the aircraft.

If desired, the aircraft air speed indicator system can be linked with the landing gear retraction mechanism so that the landing gear is automatically retracted, or prepared for retraction, when a certain forward speed is reached and subsequently is automatically lowered, or prepared for lowering, when a certain forward speed is reached.

Where the VTOL aircraft has a jet engine with jet pipes which can be swivelled from a vertical thrust position into a horizontal thrust position, the inter-connecting means can comprise a mechanical linkage between the uplock catch and the jet pipes, which prevents the jet pipes from moving from their vertical thrust position until the landing gear is retracted and locked, forming part of the load-carrying structure of the aircraft. Furthermore, when the aircraft is coming into land, the, or other, mechanical linkage will prevent the landing gear from being unlocked or lowered to its "down" position until the jet pipes have been moved into a vertical thrust position.

Furthermore, with both types of VTOL aircraft the interconnecting means could comprise a mechanical linkage which operates in conjunction with a pressure-sensitive device connected to the compressor outlet of the engine, such that the landing gear uplock could not be released unless the pressure exceeded a suitable figure at which the lift was adequate. Similar use could be made of spill valve position or fuel pump stroke in the fuel system of the engine, and in this case this would show that fuel was being consumed and hence thrust developed.

It will be appreciated that within the scope of landing gear and/or other supporting structure there is included gear suitable for alighting on water.

I claim:

1. In a VTOL aircraft, the combination of a pair of structural frames one of which takes the form of the aircraft fuselage and the other of which takes the form of a wing on the fuselage, an undercarriage for the aircraft which is retractably mounted on one of the frames, said one frame having two spaced load-bearing points thereon between which it has less than the capability to sustain the loads of substantially horizontal flight, said undercarriage being pivotally mounted about one of the points to swing from its operative upright position into a retracted position in the space between the points or vice versa, and latch means for engaging the undercarriage and the frame at the other of the points in the retracted position so as to form a load-carrying structural connection therebetween.

2. The combination according to claim 1 wherein the undercarriage is retractably mounted on the wing.

3. The combination according to claim 2 wherein the points are spaced lengthwise of the wing.

4. The combination according to claim 3 wherein one of the points lies at the inboard end of the wing.

5. The combination according to claim 1 further comprising catch means operative to prevent release of the undercarriage from its retracted position until its use is desired.

References Cited in the file of this patent

UNITED STATES PATENTS

| | | |
|---|---|---|
| 2,122,214 | Reid | June 28, 1938 |
| 2,207,735 | Herb | July 16, 1940 |
| 2,299,227 | Goetz | Oct. 20, 1942 |
| 2,423,501 | Johnson | July 8, 1947 |
| 2,434,464 | Lemonier et al. | Jan. 13, 1948 |
| 2,563,263 | Nicholl | Aug. 7, 1951 |